May 20, 1924.
J. H. HANCHER
1,495,073
GRAIN SHOCK MOVER
Filed Jan. 6, 1922
2 Sheets-Sheet 1
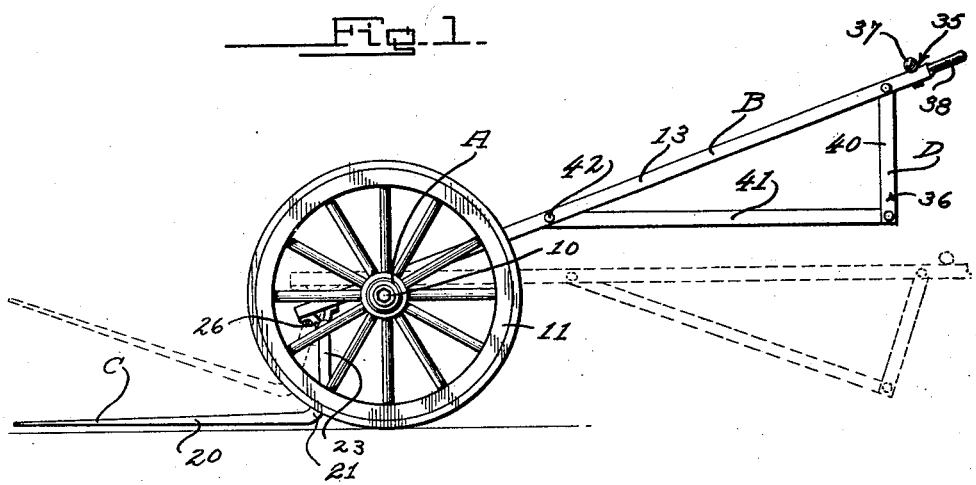
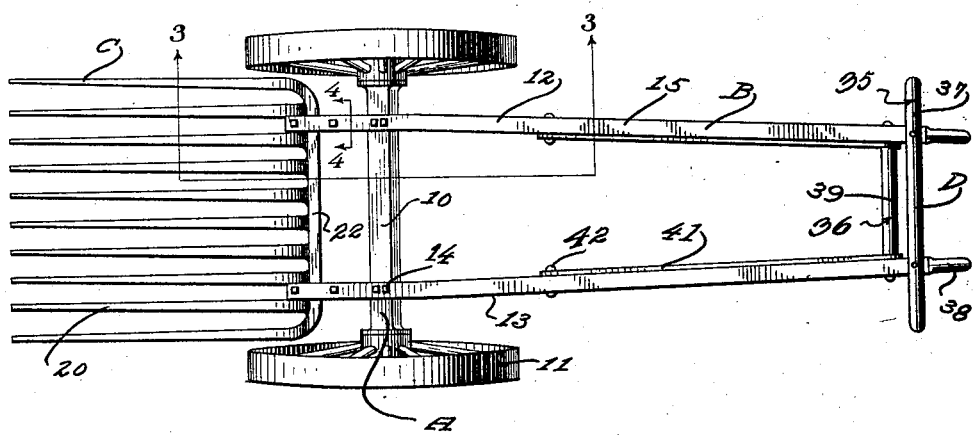
J H. Hancher
Inventor

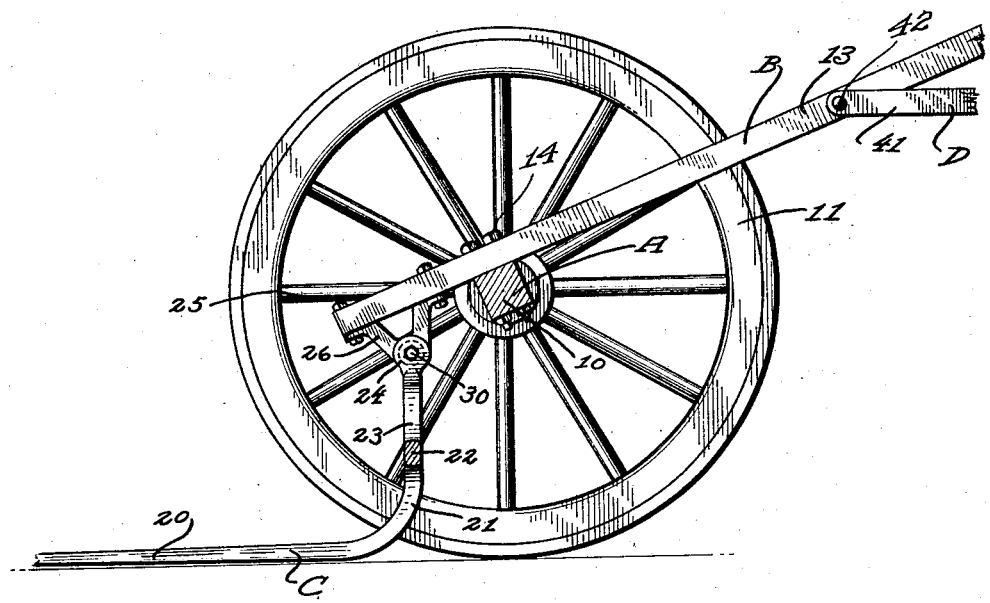
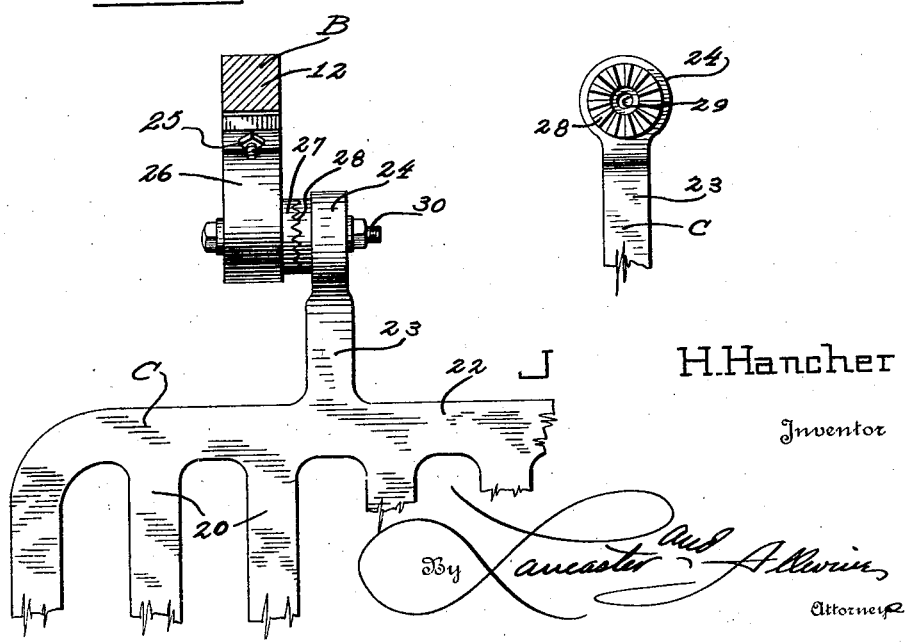

Patented May 20, 1924.

1,495,073

UNITED STATES PATENT OFFICE.

JOHN H. HANCHER, OF McHENRY, NORTH DAKOTA.

GRAIN-SHOCK MOVER.

Application filed January 6, 1922. Serial No. 527,481.

*To all whom it may concern:*

Be it known that I, JOHN H. HANCHER, a citizen of the United States, residing at McHenry, in the county of Foster and State of North Dakota, have invented certain new and useful Improvements in Grain-Shock Movers, of which the following is a specification.

This invention relates to farming implements and the primary object of the invention is to provide a novel device for handling and moving shocks of grain or the like from one part of a field to another, which will permit the quick and convenient raising and lowering of the shocks without the likelihood of the shocks becoming broken open.

A further object of the invention is to provide an improved shock mover embodying a wheeled carrier rake or similar structure and a novel handle construction, which is so disposed and related to the carrier rake structure as to allow the rake structure to be conveniently moved to a shock engaging position and to a shock lifting and carrying position, the rake carrier being so disposed when in a shock carrying position as to be out of the way of abutments, such as furrows, when the mover is being moved over a plowed field, and when the wheels of the mover drop into a furrow.

A further object of the invention is to provide means for permitting the initial adjustment of the carrier structure in relation to the handles, whereby the mover can be regulated to accord with the size of the operator using the said mover.

A further object of the invention is the provision of a shock mover embodying the shock carrier and novel handle construction which is of durable and strong construction, and which can be placed upon the market at a reasonable cost.

With these and other objects in view, the invention consists in the novel construction, arrangement and formation of parts, as will be hereinafter more specifically described, claimed and illustrated in the accompanying drawings, forming a part of this specification, in which drawings:

Figure 1 is a side elevation of the improved shock mover, showing the mover in shock engaging position in full lines and in shock carrying position in dotted lines and illustrating the use of the improved handles.

Figure 2 is a top plan view of the improved shock mover.

Figure 3 is an enlarged fragmentary longitudinal section through the improved shock mover, taken on the line 3—3 of Figure 2.

Figure 4 is an enlarged transverse section through the mover taken on the line 4—4 of Figure 2.

Figure 5 is an enlarged fragmentary detail elevation of one of the arms carried by the shock carrier.

Referring to the drawings in detail, wherein similar reference characters designate corresponding parts throughout the several views, the letter A indicates the wheeled support; B, the frame; C, the shock carrier; and D, the novel handles associated with the frame B.

While it has been stated that the device is specifically adapted for transporting shocks of grain from one part of a field to another, it is of course apparent that the device may be conveniently used for other purposes, such as gathering straw, carrying manure, and the like.

The wheeled support A includes an axle 10, which may have formed on the terminals thereof ordinary axle spindles for the reception of ground wheels 11. These wheels may be of any preferred type and constructed in accordance with the purposes intended.

The frame B includes a pair of spaced beams 12 and 13 which are secured adjacent to their forward ends by bolts 14 or the like to the axle 10. These beams 12 and 13 may extend in parallel relation at their forward ends and converge toward each other as at 15 at their rear ends. The normal position of these beams are at an incline to the horizontal, as can be readily seen from Figure 1 of the drawing, the purpose of which will be hereinafter more fully described.

The novel shock carrier C can be of a rake construction if preferred, that is, the same can include a plurality of spaced tines 20. The forward ends of these tines can be sharpened, so as to permit the penetration of a shock of grain. These tines are disposed in spaced parallel relation and normally extended in a horizontal plane as clearly shown from Figure 1 of the drawings. The rear terminals of the tines 20 are angled upwardly as at 21 and connected by a cross bar 22, which may form a continuation of the end tines 20. The cross bar 22 adjacent to its terminals has formed thereon the upwardly extending arms 23, terminating in disc shaped heads 24. The lower face of the beams 12 and 13 have bolted or otherwise secured thereto as at 25 the depending V-shaped brackets 26. The apex portions of the V-shaped brackets 26 can be provided with disc shaped heads 27 and these heads 27 and the heads 24 are provided with clutch faces 28 for intermeshing engagement with one another. The heads 27 and 24 are provided with axial openings 29 for the reception of the adjusting bolts 30. It is obvious by this construction that the beams 12 and 13 can be readily adjusted in relation to the carrier C for a purpose which also will be hereinafter more fully described.

The arrangement of the handles D form an important part of the invention and constitute the means whereby the rake carrier C can be readily manipulated and held in the desired position. The handles D include an upper handle structure 35, and a lower handle structure 36. The upper handle structure 35 includes a cross bar 37, which may be grasped by the hands of the user when the device is used for carrying the shocks. This cross bar 37 acts in the nature of a reinforcing bar for the frame to hold the beams 12 and 13 in their spaced relation. The ends of the beams 12 and 13 terminate in hand grips 38 as clearly shown in the drawings, and in actual practice the hand grips 38 will be grasped by the hands of the user when the device is in use for carrying the shocks of grain.

The lower handle structure 36, which is used when the shocks are being moved on or off the carrier structure C includes a transversely extending bar 39. This bar 39 can be supported by depending straps 40, which can be braced by forwardly extending straps 41. The forward ends of the reinforcing straps 41 are secured as at 42 to the beams 12 and 13 at a point intermediate their ends.

In use of the improved shock carrier, the bolts 30 are loosened, and the beams 12 and 13 are initially adjusted so as to position the handle structure D at a point which will be most convenient to the operator. The shock carrier is then wheeled to the field, and when it is desired to lift a shock of grain on the carrier C, the lower handle structure 36 is grasped, which will position the carrier structure C in parellel relation to the ground so that the same can be conveniently forced into engagement with the shock. The carrier is then moved forwardly and the tines 20 will engage the shock. The hand grips 38 can then be grasped and the frame moved downwardly, which will move the carrier structure C to the dotted line position shown in Figure 1 of the drawings. The device can then be conveniently pushed over the field to the desired point and when it is desired to deposit the bundle, it is merely necessary to again grasp the cross bar 39 and raise up the beams 12 and 13. This will again position the carrier structure C parallel to the ground and a slight rearward movement of the device will allow the disengagement of the carrier C from the shock.

From the foregoing description, it can be seen that the improved carrier can be effectively used in moving shocks of grain, and the carrier is particularly adaptable for moving shocks of grain from one part of a field to another, while the field is being plowed and before the grain has been threshed.

By moving the grain from one part of a field to another, no time is wasted in waiting for the threshing of the grain as the field can be plowed by moving the grain from place to place with the improved carrier, which of course, simplifies this work.

Changes in details may be made without departing from the spirit or scope of this invention; but,

I claim:

1. The combination with a wheeled support including a transversely extending axle and ground wheels rotatably mounted thereon, of a longitudinally extending frame including spaced beams, hand grips formed on the rear ends of the beams, a transversely extending handle bar disposed in a plane below and connected with the beams, a carrier including a plurality of spaced tines, upwardly extending arms connected with the carrier, depending brackets secured to the forward ends of the beams, and means for pivotally securing the arms to said brackets whereby the angle of said carrier in relation to the frame can be adjusted to suit varying conditions.

2. The combination with a wheel support including a transversely extending axle and ground engaging wheels rotatably mounted thereon, of a frame including longitudinally extending beams secured to the axle in spaced relation to each other and extending forwardly of the axle, a carrier positioned beneath the forward end portions of said beams and extending forwardly beyond the forward ends of the beams, arms extending upwardly from the rear end portion of said carrier, depending brackets carried by the forward end portions of said beams, pivot means carried by said brackets and extending through said arms to pivotally mount the carrier, and means carried by the brackets and arms to retain the carrier in angularly adjusted position with respect to said beams.

JOHN H. HANCHER.